United States Patent [19]

Kessels

[11] Patent Number: 4,808,003
[45] Date of Patent: Feb. 28, 1989

[54] ARRANGEMENT FOR OPTICALLY MEASURING THE PROFILE OF A RADIATION REFLECTING SURFACE

[75] Inventor: Henricus M. M. Kessels, Eindhoven, Netherlands

[73] Assignee: U.S. Philips Corporation, New York, N.Y.

[21] Appl. No.: 929,234

[22] Filed: Nov. 10, 1986

[30] Foreign Application Priority Data

Nov. 19, 1985 [NL] Netherlands ................. 8503182

[51] Int. Cl.$^4$ .......................................... G01B 11/24
[52] U.S. Cl. ................................... 356/376; 356/375
[58] Field of Search ............... 250/201 AF; 356/375, 356/376

[56] References Cited

U.S. PATENT DOCUMENTS

| | | | |
|---|---|---|---|
| 3,719,421 | 3/1973 | Poilleux et al. | 250/201 AF X |
| 4,017,188 | 4/1977 | Sawatari | 356/376 X |
| 4,158,507 | 6/1979 | Himmel | 356/376 |
| 4,383,168 | 5/1983 | Luck, Jr. | 250/201 AF |
| 4,427,880 | 1/1984 | Kanade et al. | 356/376 X |
| 4,579,453 | 4/1986 | Makita | 356/375 |
| 4,627,734 | 12/1986 | Rioux | 356/376 |

Primary Examiner—Gene Wan
Attorney, Agent, or Firm—Robert T. Mayer

[57] ABSTRACT

An optical height measuring arrangement is described in which the radiation reflected from the surface to be measured is projected towards a position-dependent radiation-sensitive detection system via a lens system. The direction of the beam which is incident on the surface is varied at a high frequency and the amplitude of the output signal of the detection system is a measure of the distance to be measured. When two detection systems are employed it is also possible to measure the surface roughness.

13 Claims, 8 Drawing Sheets

ARRANGEMENT FOR OPTICALLY MEASURING THE PROFILE OF A RADIATION REFLECTING SURFACE

The invention relates to an arrangment for optically measuring a surface profile, comprising a radiation-source unit, a lens system for deflecting the radiation produced by the radiation-source unit to form a radiation spot on the surface, and a position-dependent radiation-sensitive detection system arranged in the path of the radiation reflected from the surface. The invention also relates to an apparatus comprising such a measuring arrangement, for detecting electronic components on a support.

Herein "measuring a surface profile" is to be understood to mean: measuring the position and the inclination of the surface in the direction of the optical axis of the arrangement, but also measuring the surface roughness or the surface contour.

The position-dependent radiation-sensitive detection system is a system which supplies an output signal which depends on the position of the centre of gravity of the radiation which is incident (projected) on the radiation-sensitive surface of this system.

U.S. Pat. No. 3,876,841 describes an apparatus for reading an optical record carrier, comprising a system for determining the position of the radiation-reflecting information surface relative to an objective system. The electric signal supplied by the position-detection system is utilized for correcting the position of the objective system relative to the information surface. In the position-detection system described therein a narrow beam of radiation is incident on the information surface at a constant angle relative to the optical axis of the objective system. The radiation reflected by the surface is focussed by the objective system to form a radiation spot on a position-dependent radiation-sensitive detection system. The position of the radiation spot on the detection system, which in the present example comprises two radiation detectors, is a measure of the position of the information surface relative to the objective system.

Favourable properties of this method of determining the distance of the objective system from the surface, described in U.S. Pat. No. 3,876,841 are a high measurement accuracy, a large measurement range and a high measurement frequency. A disadvantage of this method is that the desired free operating distance, that is the distance between the reference plane and the objective lens, limits the angle at which the reflected radiation can still be received. This limits the maximum inclination of the surface or, conversely, a large maximum inclination implies a comparatively small free operating distance. A second disadvantage is the constant angle of incidence, as a result of which steep height variations cannot be measured correctly owing to the shadow effect. A third disadvantage is that the optical system is intended only for measuring reflecting surfaces.

It is the object of the present invention to overcome such drawbacks, while maintaining the favourable properties. To this end an arrangement in accordance with the invention is characterized in that the radiation-source unit is constructed to produce a radiation beam whose direction varies in time, the average direction of the beam being substantially perpendicular to the surface to be measured and the direction of the beam always passing through substantially the same point, which point is situated at the same side of the lens system as the surface.

The average location where the radiation which is reflected or diffused by the surface to be measured is focussed on the position-dependent radiation-detection system depends on the distance from a reference plane, on the inclination and the roughness of the surface to be measured, and on the angle of incidence of the radiation beam. When the roughness is known the other parameters of the surface can be determined by ensuring that the radiation is incident at different angles.

The invention can be utilized in all cases where the properties of a surface have to be determined. The present invention is of particular importance in all those cases where rapid measurements without the risk of damaging or deformation are necessary. This is for example so in detecting the positions of electronic components on a support or the thickness of the molybdenum band in the manufacture of high-pressure mercury-vapour lamps.

As is stated above, the roughness of the surface, and hence the relative ratio between the radiation reflected from the surface and the radiation diffused by the surface, influences the position of the centre of gravity of the radiation spot on the position-dependent radiation-detection system. This means that if one detection system is employed the surface roughness must be known in order to enable the height to be determined from the output signal of the detection system. In order to mitigate this drawback and at the same time determine the height and roughness of the surface, an embodiment of the invention is characterized further in that a beam splitter divides the radiation reflected from the surface between two position-dependent radiation-sensitive detection systems which are arranged at different optical distances from the surface to be measured.

An embodiment of the invention is characterized further in that the radiation-source unit comprises one radiation source and one beam-deflecting element. This beam-deflecting element is necessary in order to ensure that the radiation beam, whose frequency is in conformity with the use of the arrangement impinges at different angles on the surface to be measured.

An arrangement in accordance with the invention may be characterized further in that the beam-deflecting element comprises a plane mirror which oscillates about an axis in the mirror plane and transverse to the chief ray of the radiation beam. Mechanical oscillating mirrors with the desired excursion of approximately 1° can be manufactured comparatively simply and can be oscillated at frequencies of the order of 10 kHz.

An embodiment in which a higher measuring frequency is attainable than by mechanical means and which does not comprise any moving parts is characterized further in that the beam-deflecting element is an acoustooptical element. By means of such an element scanning frequencies of the order of 10 MHz can be obtained.

An arrangement in accordance with the invention may be characterized further in that the radiation-source unit comprises a plurality of radiation sources and a control circuit for switching the radiation sources sequentially on and off. This enables a high measurement frequency to be attained in a comparatively cheap way.

In order to increase the radiation intensity on the position-dependent radiation-sensitive detection systems an embodiment of the invention is characterized further in that a quarter-wave plate and a polarization-sensitive beam splitter are arranged, in this order, between the lens system and the position-dependent radiation-sensitive detection system and in that the radiation produced by the radiation-source unit is linearly polarized.

An arrangement in accordance with the invention may be characterized further in that the direction of the beam of radiation incident on the surface to be measured varies simultaneously in two mutually perpendicular directions. Varying the direction of the radiation beam in two mutually perpendicular directions enables inclination measurements in both directions to be effected simultaneously.

In accordance with the invention an apparatus for detecting components on a support by measuring the distance of the top of the component or the support from a reference plane is characterized in that said distance is determined by means of an arrangement for measuring a surface profile in accordance with one of the embodiments described in the foregoing.

In accordance with the invention an apparatus for detecting components on a support may be characterized further in that the apparatus comprises a circuit which determined the phase relationship between the direction of the radiation emitted by the radiation-source unit and the output signal of the position-dependent radiation-sensitive detection system. As the phase of the output signal of the positive-dependent radiation-sensitive detection system in the situation in which a surface is disposed above the reference plane is opposed to the phase in the situation in which a surface is disposed below the reference plane, this circuit simply enables the presence or absence of a component on the support to be detected.

Embodiments of the invention will now be described in more detail, by way of example, with reference to the accompanying drawings, in which:

FIGS. 1a, 1b and 1c illustrate the inventive principle in the case of a purely relfecting surface, FIGS. 2a, 2b and 2c illustrate the inventive principle in the case of an entirely mat surface, FIG. 3 illustrates schematically the relationship between the measurement signal and the parameters of the arrangement and the surface to be measured, FIG. 4 shows an embodiment for simultaneously measuring the height, inclination and roughness of the surface, FIGS. 5a and 5b are block diagrams for the analog measurement of the height when the roughness and inclination are unknown, FIG. 6 is a block diagram of an alternative circuit for determining the height, FIGS. 7a, 7b and 7c show different examples of the light-source unit, and FIG. 8 shows an apparatus for detecting the positions of components on a supporting surface in accordance with the invention.

As already stated, the surface roughness influences the height measurement. For the sake of clarity the inventive principle is therefore first described for a purely reflecting surface with reference to FIGS. 1a, 1b and 1c.

The radiation-source unit 10 comprises a radiation source 11, for example a diode laser and a collimator lens, and emits a narrow beam 15 towards a mirror 20. In point A the mirror 20 reflects the beam towards a lens system 40, which may comprise one or more lenses, and the lens system 40 directs the beam towards point B, which is the point where point A is imaged on the mirror by the lens system. The plane containing point B and extending perpendicularly to the optical axis of the lens system 40 is referred to as the reference plane. The radiation beam reflected from a specularly reflecting surface 50 of an object again traverses the lens system 40 and is reflected towards a position-sensitive radiation-detection system 60 by a beam-splitting element 30, for example a semi-transparent mirror. If the surface 50 coincides with the reference plane point A is imaged in point C of the detection system 60 by way of point B. In this situation the position of the radiation spot C formed on the detection system 60 does not change when the mirror 20 in rotated about an axis 21 transverse to the radiation beam 15 through point A in the mirror plane, as is indicated by the two extreme positions of the radiation beam. Within certain limits the output signal of the position-dependent detection system 60 is therefore independent of the angle at which the mirror 20 is disposed.

FIG. 1b illustrates how this situation changes when the reflecting surface 50 is moved towards the lens system over a distance Z. The incident beam of radiation, of which the two extreme positions are indicated, is reflected and intersects the optical axis in point B' at a distance 2Z above the reference plane. The image C' of B' formed by the lens system 40 by the beam splitter 30 is situated behind the position-dependent radiation-detection system 60. An oscillation of the mirror 20 about the axis 21 now results in the radiation spot formed on the detection system 60 performing an excursion and the output signal of the detection system 60 exhibiting an oscillation whose amplitude is a measure of the distance Z between the reflecting surface 50 and the reference plane.

When the reflecting surface 50 does not extend parallel to the reference plane the point of intersection B' of the reflected beams is not situated on the optical axis. The position of the radiation spot on the position-dependent radiation-detection system 60 then exhibits a displacement whose magnitude depends on the distance Z and on the angle between the plane 50 and the reference plane. This means that not only the height Z but also the angle of inclination of the surface 50 can be derived from the average level and amplitude of the output signal.

FIG. 1c illustrates the situation in which the surface 50 is situated at a distance Z below the reference plane. Apparently, the radiation reflected from the surface 50 intersects the optical axis in point B'' at a distance 2Z below the reference plane and the image point C'' is situated before the detection system 60. This means that the phase of the output signal of the detection system 60 is opposite to that of the signal in the situation in which the surface 50 is situated above the reference plane. When the surface 50 is inclined relative to the reference plane the measurement of the height and the angle proceeds in a manner similar to that described for the situation with reference to FIG. 1b.

FIGS. 2a, 2b and 2c illustrate the use of the inventive principle for measurements on a mat surface.

In FIG. 2a the perfectly mat surface 50 coincides with the reference plane. The beam which is incident on the matt surface 50, which is shown in one position only, forms a radiation spot in point B, which spot may be regarded as a radiation source situated on the surface 50. By means of the lens system 40 this is imaged on the position-dependent detection system 60 in point C by the beam splitter 30. As the position of the radiation spot on the surface 50 is independent of the position of the mirror 20 the output signal of the detection system 60 is now also constant when the mirror 20 is rotated.

In FIG. 2b the matt surface 50 is situated at a distance Z above the reference plane. When the mirror 20 oscillates, the radiation spot formed by the beam which is incident on the surface 50 performs an excursion having an amplitude proportional to Z. The lens system 40 images the spot in point E' by the beam splitter 30, which point E' performs an excursion in a plane behind the plane of the position-dependent detection system 60. The image of the radiaton spot on the surface 50 formed on the position-dependent detection system 60 is now out-of-focus. As the output signal of the detection system 60 is proportional to the position of the centre of gravity of the radiation incident on this system, this focussing error has little influence on the output signal, provided that the size of the radiation spot is small relative to the dimensions of the detection system 60. When the mirror 20 is rotated the resulting light spot travels over the surface 50 and its image on the detection system 60 performs a corresponding excursion, which results in an oscillation in the output signal. It is to be noted that when the distance Z remains the same the amplitude of the output signal in the case of a perfectly mat surface 50 is equal to half the corresponding amplitude in the case of a reflecting surface. In the case of an inclined position of the surface 50 the maximum excursion of the radiation spot formed on this surface differs in the two directions and as a result the magnitude of the angle between the surface 50 and the reference plane can be derived from the asymmetry of the output signal.

FIG. 2c illustrates the situation in which a matt surface 50 is situated at a distance Z below the reference plane. The description is almost identical to the description of the situation with reference to FIG. 2b, except that now the phase of the output signal of the position-dependent radiation-detection system 60 is opposed to that of the output signal obtained in the situation of FIG. 2b.

The inventive principle for specularly reflecting as well as mat surfaces may be summarized as follows. The reference surface is imaged on the radiation-sensitive detection system 60 by the objective lens 40. When ignoring a magnification factor, the radiation distribution on the light-sensitive surface of the system 60 is therefore equal to the virtual radiation distribution in the reference plane. The radiation in the reference plane comprises radiation which is diffused by the surface 50 and whose centre of gravity is situated at the same distance from the optical axis of the lens system 40 as the radiation spot on the surface, and reflected radiation whose position in the reference plane, in conformity with the well-known reflection laws, depends on the position, inclination and angle of incidence of the radiation beam on the surface 50. Since a surface is hardly ever or never perfectly reflecting or perfectly mat the output signal of the detection system 60 depends on the relative ratio between the two effects.

FIG. 3 illustrates schematically the contributions by the various effects. FIG. 3 shows a surface O—O' whose normal extends at an angle $\beta$ to the optical axis A—A' of the objective system. The narrow beam of incident radiation is shown in its two extreme positions, indicated by the lines $L_1$ and $L_2$, which each make an angle $\alpha$ with the optical axis. It is assumed that the situation is a general situation in which instead of the reference plane a plane V—V', which extends parallel to and is spaced at a distance d from the reference plane, is imaged on the position-dependent radiation-detection system.

The peak-to-peak amplitude A of the output signal of the position-dependent radiation-sensitive detection system 60 may be represented by $$A(Z) = C\{S\, R(Z) + (1-S)\, V(Z)\}$$

where C is a proportionally constant which allows for the optical magnification factor, a conversion factor and, if applicable a gain factor, S is the ratio between the amount of specularly reflected radiation and the total amount of radiation reflected from the surface 50, R (Z) is the peak-to-peak amplitude of the excursion of the centre of gravity of the specularly reflected radiation in the plane V—V', and V (Z) is the peak-to-peak amplitude of the diffused radiation in this plane received by the objective system. The error as a result of the limited aperture angle of the objective system may be ignored when the values of the angles $\alpha$ and $\beta$ are small relative to the numerical aperture of the objective system.

It follows from FIG. 3 that $$R(Z) = (Z + d + \Delta Z_1)\tan(\alpha + 2\beta) + (Z + \Delta Z_1)\tan \alpha + (Z - \Delta Z_2)\tan \alpha + (Z + d - \Delta Z_2)\tan(\alpha - 2\beta)$$

where $\Delta Z_1 = Z \tan \alpha \tan \beta / (1 - \tan \alpha \tan \beta)$; $\Delta Z_2 = z \tan \alpha \tan \beta / (1 + \tan \alpha \tan \beta)$ Here $\alpha$ is the maximum angle at which the radiation beam is incident and $\beta$ is the angle of inclination of the object. As in the case of a matt surface 50 the centre of gravity of the radiation distribution in the plane V-V' is situated at substantially the same distance from the optical axis as the radiation spot on the surface 50, V(Z) may be written as:

$$V(Z) = 2Z \tan \alpha / (1 - \tan^2 \alpha \tan^2)$$

The average of the output signal of the radiation-sensitive detector is:

$$M(Z) = C\{S M_R(Z) + (1-S) M_V(Z)\}$$

where C and S have the same meanings as above, and $M_R$ and $M_V$ are the centres of the oscillations for the reflected radiation and the diffused radiation respectively in the reference plane. From FIG. 3 it follows for $M_R(Z)$ and $M_V(Z)$ that:

$$M_R(Z) = \tfrac{1}{2}\{(Z + d + \Delta Z_1)\tan(\alpha + 2\beta) + (Z + \Delta Z_1)\tan \alpha - (Z - \Delta Z_2)\tan \alpha - (Z + d - Z_2)\tan(\alpha - 2)\};$$

$$M_V(Z) = \tfrac{1}{2}\{(Z + \Delta Z_1)\tan \alpha - (Z - \Delta Z_2)\tan \alpha\}$$

In the two formulas given for M(Z) and A(Z) the three parameters (Z, $\beta$, S) to be determined are related to constants of the arrangement (C, d, $\alpha$) and to measurable parameters (A, M). For the ultimate determination at least one more similar relationship is required.

FIG. 4 illustrates how this further relationship is obtained in an arrangement in accordance with the invention. Between the first beam splitter 30, here represented as a polarization-sensitive splitting prism in conjunction with a quarter-wave plate 31, and the first position-dependent radiation-sensitive detection system 60 a second beam splitter 35 is interposed, which directs a part of the reflected radiation towards a second position-dependent radiation-sensitive detection system 70. This system 70 is arranged in such a way that the plane imaged on it by the objective system 40 is situated at another optical distance from the reference plane than the plane imaged on the system 60.

This yields two further independent relationships between the parameters of the arrangement and the three quantities to be measured.

In principle, the given relationships enable expressions for S, $\beta$ and Z to be found in which these parameters are expressed in parameters of the arrangement and measured signals.

An embodiment which imposes simple requirements on the signal processing can be obtained when the angles $\alpha$ and $\beta$ are limited to small values. The peak-to-peak amplitudes may then be approximated by:

$$R(Z) = 2Z \tan \alpha + (Z+d)(\tan(\alpha+2\beta) + \tan(\alpha-2\beta))$$

and $$V(Z) = 2Z \tan \alpha$$

The relative error in these expressions is less than 1% for values of $\alpha$ and $\beta$ smaller than 5°.

If the amplitude, the proportionally constant and the distance of the plane to be imaged (V—V' in FIG. 3) from the reference plane are $A_1$, $C_1$ and $d_1$ respectively for the detection system 60 and $A_2$, $C_2$ and $d_2$ respectively for the detection system 70, the relationships for the peak-to-peak amplitudes will be as follows:

$$A_1(Z) = C_1(Z(a+Sb) + d_1 Sb)$$

$$A_2(Z) = C_2(Z(a+Sb) + d_2 Sb)$$

where a represents $2 \tan \alpha$ and b represents $\tan(\alpha+2\beta) + \tan(\alpha-2\beta)$. It can be derived simply that:

$$Z = (d_2 C_2 A_1 - d_1 C_1 A_2)/(C_1 A_2 - C_2 A_1 + C_1 C_2 (d_2 - d_1)A)$$

This computation can be effected simply by means of analog electronic circuitry. If the distance $d_1 = 0$, the expression for the height may be written as:

$$Z = (d_2 A_1 C_2/C_1)/(A_2 - A_1 C_2/C_1 + C_2 d_2 a)$$

FIG. 5a is a block diagram for realizing this. The output signal of the position-dependent radiation-sensitive detection system 60 is multiplied by a factor $-C_2/C_1$ in the amplifier circuit 62, after which the signal is split. In one branch an amplifier 63 multiples the signal by a factor $-d_2$ and in the other branch a summing device 75 adds the signal to the output signal of the detection system 70 and a constant signal equal to $C_2 d_2 a$ from a source 80. In an analog divider 81 the output signal of the amplifier 63 is divided by the output signal of the summing device 75. Consequently, the output signal of the divider 81 is proportional to the height Z to be measured.

FIG. 5b shows a slightly different circuit arrangement which may be used when the detection systems do not detect the centre of gravity of the incident radiation distibution but the centre of gravity multiplied by the overall radiation intensity and a signal proportional to the overall radiation intensity. The expression for the amplitude now becomes:

$$A'(Z) = C.I(Z(a+Sb) + dSb) \text{ where } A'(Z) = I.A(Z)$$

and the expression for Z becomes:

$$Z = (d_2 A_1' C_2/C_1)/(A_2' C_2/C_1 C_2 I_2 d_2 a)$$

The circuit arrangement in FIG. 5b differs from that in FIG. 5a in that the constant signal supplied by the source 80 is replaced by a signal proportional to the intensity on the detection system 70, which signal is obtained by multiplying the intensity signal by a factor $C_2 d_2$ in an amplifier 73.

The last expression for Z shows that the demoninator of the quotient is proportional to the radiation intensity received by the detection systems and hence to the radiation intensity emitted by the radiation-source unit. By varying the radiation intensity it is therefore possible to give the denominator of the expression a constant value, after which the value of the output signal of the detection system 60 is directly proportional to the height Z to be measured, which means that the expensive analog divider circuit may be dispensed with.

FIG. 6 shows a block diagram of such an arrangement. A comparator 77 compares the output signal of the summing device 75 with a reference signal from a source 76. The control circuit 78 for the radiation-source unit controls the intensity of the radiation source until the output signal of the summing device 75 has become equal to the reference signal. The height Z now follows directly from the magnitude of the output of the position-dependent radiation-sensitive detection system 60.

The foregoing description is based on an arrangement in which the various directions along which the beam of radiation is incident on the surface to be measured are situated in the same plane. An embodiment of the invention may also comprise a raidation-source unit in which the emitted radiation is varied in two mutually perpendicular directions, for example, by two oscillating mirrors.

FIG. 7a shows an acousto-optical element 120 in which acoustic vibrations are produced by means of an electronic signal source 121. The direction of the traversing beam of radiation is thus varied in known manner.

Figure 1A:
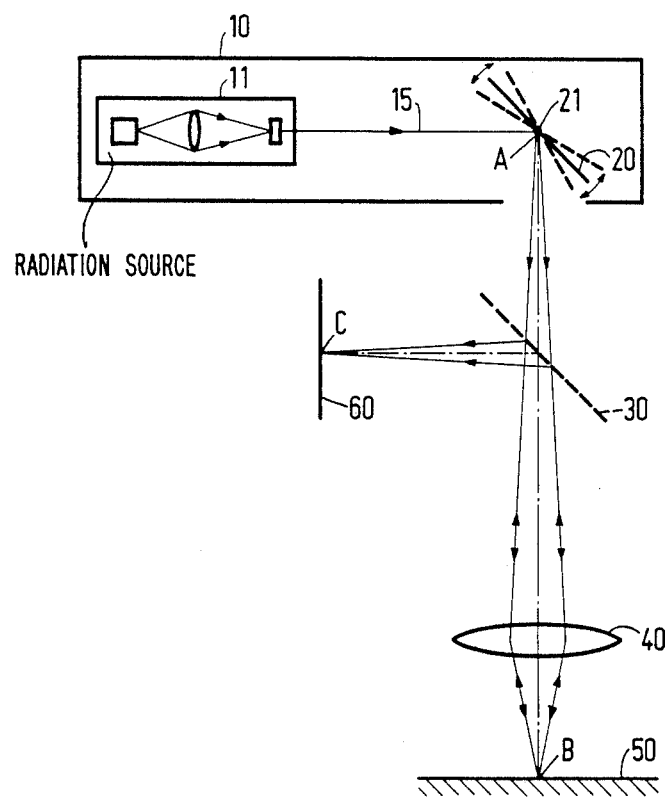
Figure 1C:
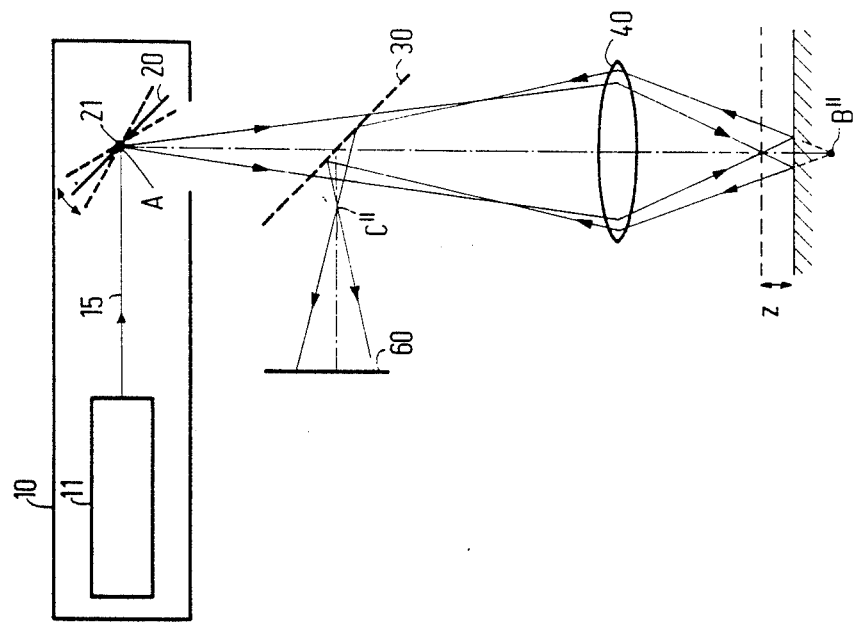
Figure 1B:
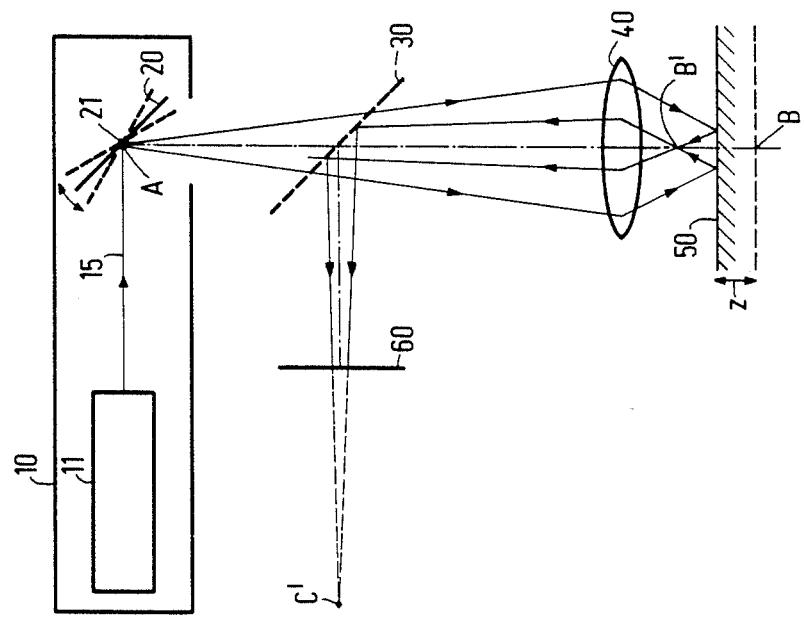
Figure 2A:
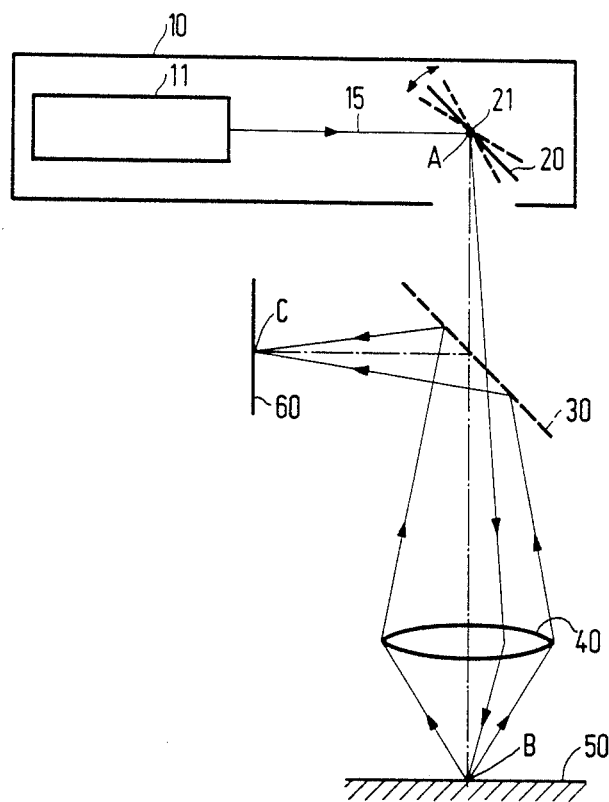
Figure 2C:
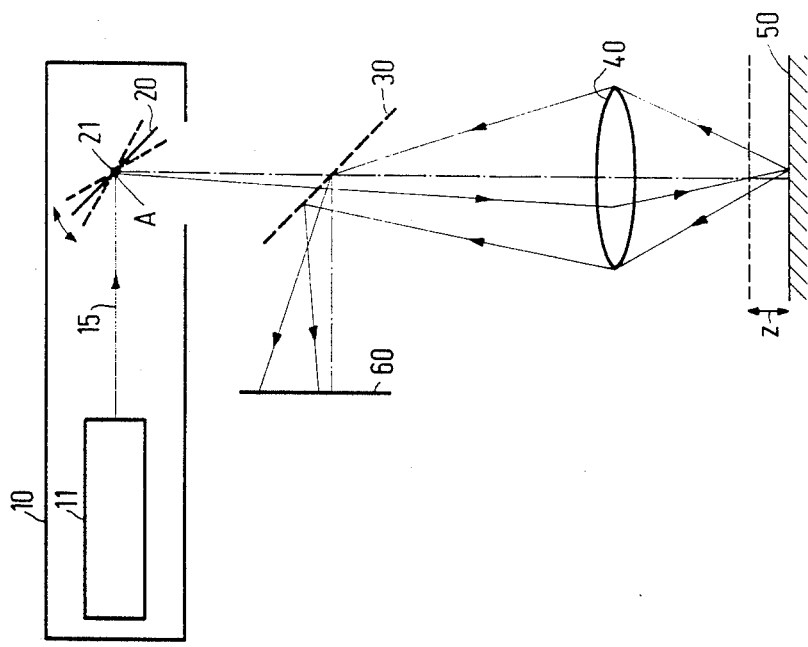
Figure 2B:
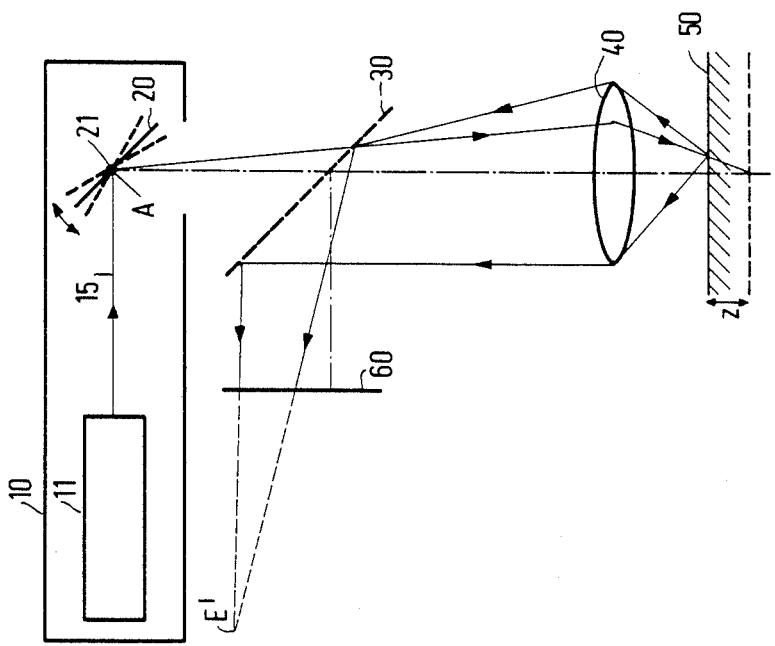
Figure 3:
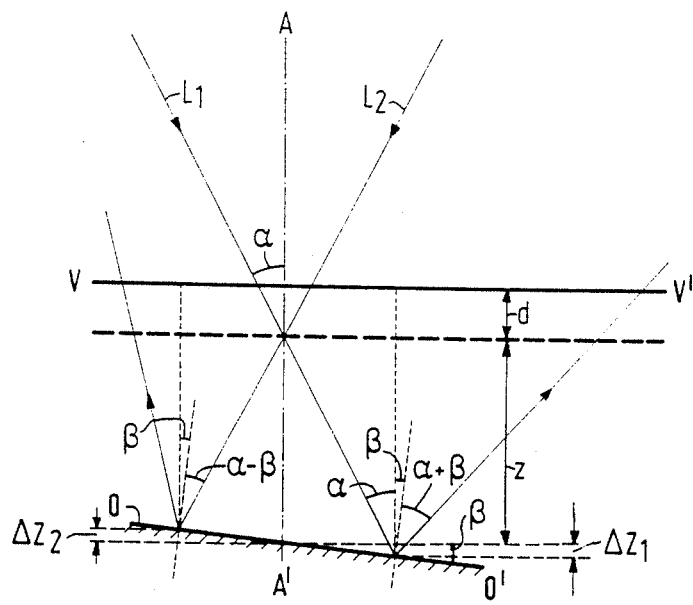
Figure 4:
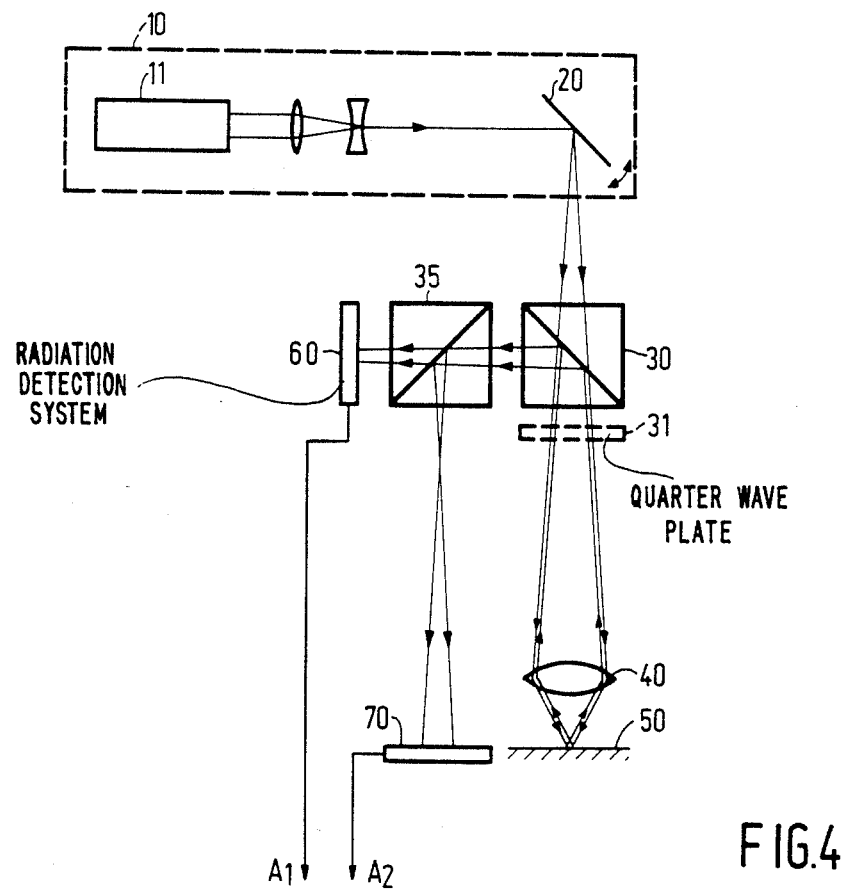
Figure 5A:
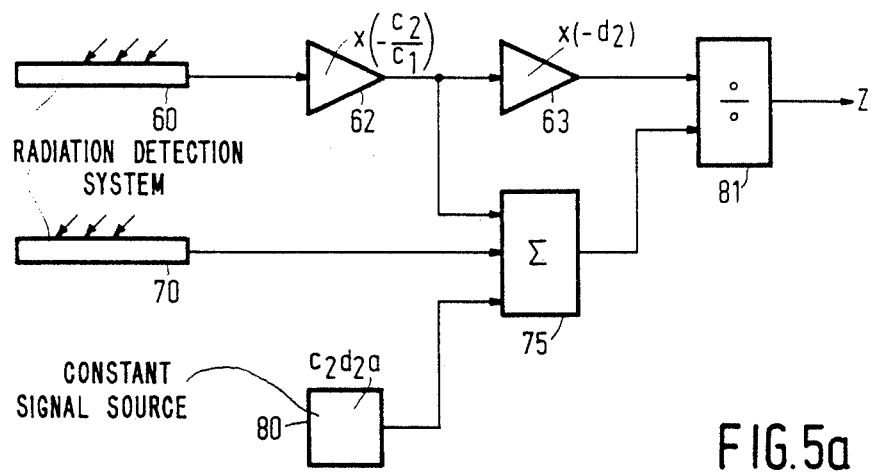
Figure 5B:
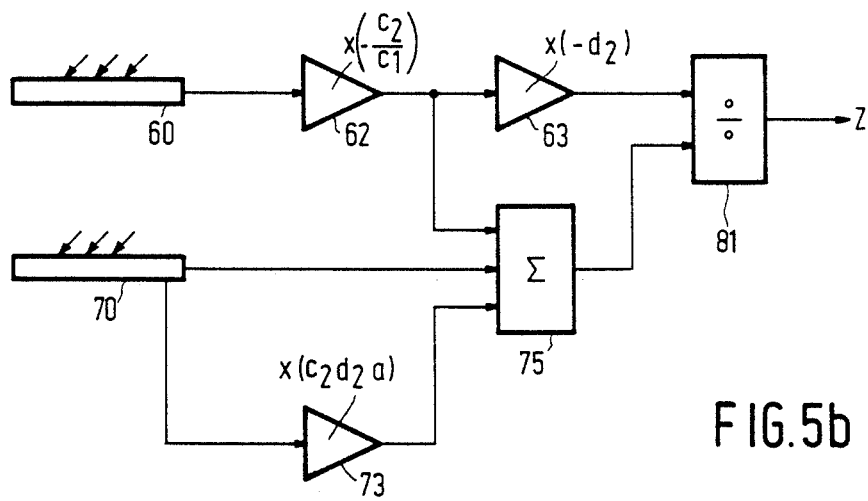
Figure 6:
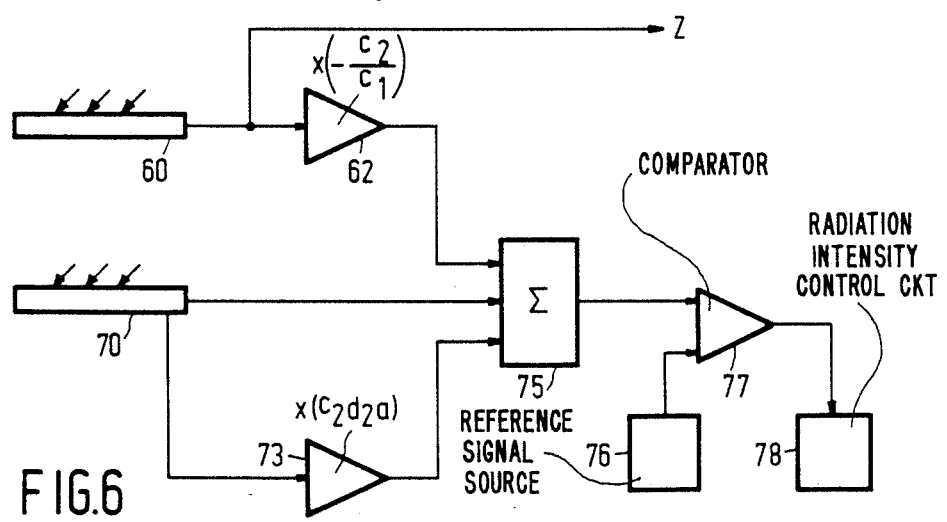
Figure 7A:
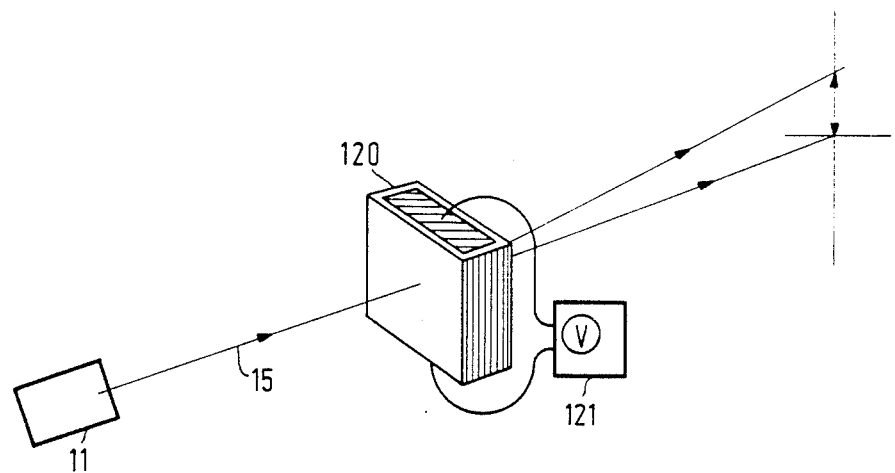
FIGS. 7a, 7b and 7c show three examples of the beam-deflecting element in the radiation-source unit as an alternative to the oscillating mirror in FIGS. 1, 2 and 4.
Figure 7B:
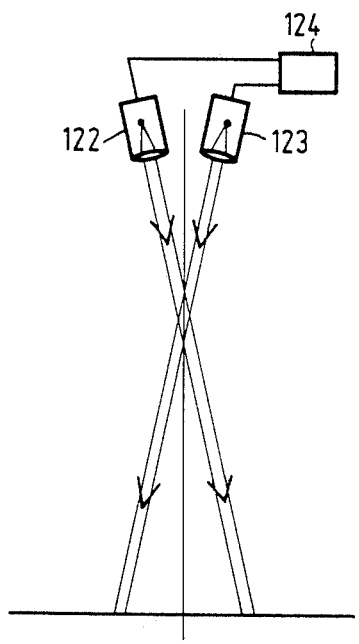

FIG. 7b shows a radiation-source unit comprising two radiation sources 122 and 123 whose emergent radiation beams make an angle with one another. When the sources 122 and 123 are alternately turned on and off by means of a control unit 124 the direction of the beam emerging from the radiation-source unit is varied periodically. It will be obvious that such a radiation-source unit may also comprise more than two radiation sources arranged, for example, along a circle.

Figure 7C:
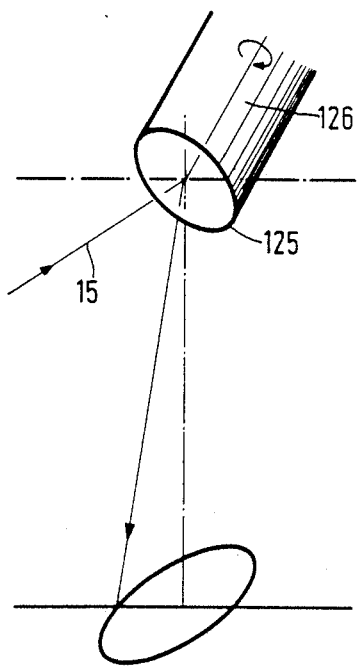

FIG. 7c shows a beam-deflecting element comprising a mirror 125 arranged on an end face of a cylinder 126, so that there is a small angle between the normal to the mirror plane and the cylinder axis. When the cylinder is rotated about its axis by a drive system an incident radiation beam 15 will be reflected in such a way that the direction of the reflected beam oscillates in two mutually perpendicular directions.

Figure 8:
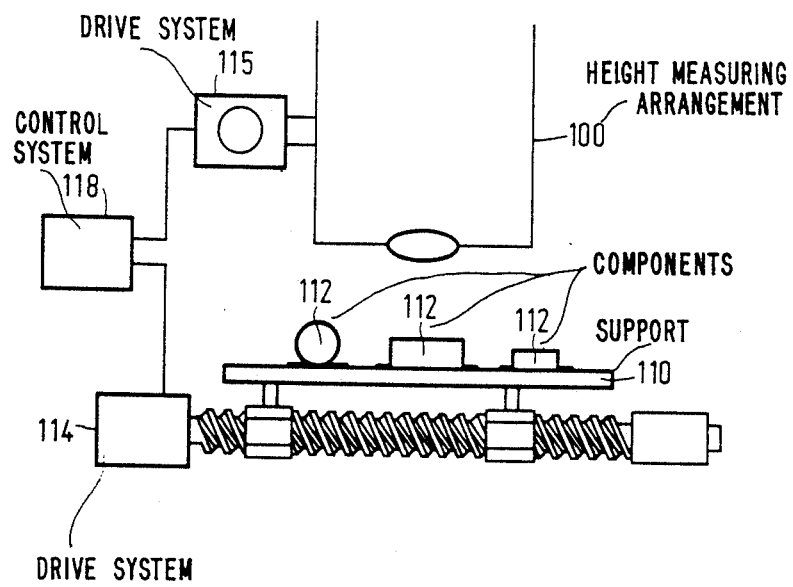

FIG. 8 shows an apparatus in accordance with the invention for detecting the positions of components on a support. In this Figure the reference numeral 100 schematically represents a height measuring arrangement as described above. The support 110 carries components 112, which differ from the support by a difference in height. The support 110 is moved in a first direction underneath the height-measuring arrangement, for example by a drive system 114, and the height measuring arrangement 100 is moved, in a second direction perpendicular to the first direction, for example by a drive system 115, both directions being parallel to the plane of the support. The two drive systems are controlled by a control system 118 in such a way that the entire surface area passes underneath the objective lens, for example in a zig-zag movement. The movement of the support may be continuous or in steps. The movement is so slow that it is possible to ascertain at any position whether a component is present or absent.

An embodiment by means of which components can be identified on the basis of the height, roughness and inclination of the upper surface requires the use of a height measuring arrangement comprising two position-dependent radiaton-sensitive detection systems.

When it is required to determine only whether or not a component is present on the support at a predetermined position, the height measuring arrangement can be of comparatively simple construction. Only one position-dependent radiation-sensitive detection system is needed and the electronic circuitry can be limited to a circuit which compares the phase of the output signal with the phase of the direction of the radiation beam emitted by the radiation-source unit. The height of the support must be adjusted so that the surface of the support is situated below the reference plane and the upper surface of the lowest component to be detected is situated above the reference plane. When, for example, the output signal is in phase with the radiation-source unit a component is present and in the case of phase opposition no component is present.

What is claimed is:

1. An arrangement for optically measuring the profile of a radiation reflecting surface comprising a radiation source means for producing radiation, a lens system for deflecting the radiation produced by the radiation source means to form a radiation spot on the surface, said radiation being reflected from said surface, and a radiation sensitive detection system arranged in the path of the radiation reflected from the surface, wherein the radiation source means produces a radiation beam whose direction varies in time, the average direction of the beam during any particular measurement performed by said arrangement being substantially perpendicular to the surface to be measured and said beam during any particular measurement performed by said arrangement always passing through substantially the same point, which point is situated in a reference plane located on the same side of the lens system as the surface, said radiation sensitive detection system including means responsive to the radiation reflected from said surface for producing a signal indicative of the distance said reflecting surface is from the focal plane of the lens system.

2. An arrangement as claimed in claim 1 including a beam splitter and two radiation sensitive detection systems wherein said beam splitter divides the radiation reflected from said surface between said two radiation sensitive detection systems which are arranged at different optical distances from the surface to be measured.

3. An arrangement as claimed in claim 1 or 2 wherein said radiation source means comprises one radiation source and one beam deflecting element.

4. An arrangement as claimed in claim 3 wherein said beam deflecting element comprises a plane mirror which oscillates about an axis in the plane of the mirror and transverse to said radiation.

5. An arrangement as claimed in claim 3 wherein said beam deflecting element is an acousto-optical element.

6. An arrangement as claimed in claim 1 or 2 wherein said radiation source means comprises a plurality of radiation sources and a control circuit for switching the radiation sources sequentially on and off.

7. An arrangement as claimed in claim 1 including a quarter wave plate and a polarization sensitive beam splitter located between the lens system and the radiation sensitive detection system and wherein the radiation produced by the radiation source means is linearly polarized.

8. An arrangement as claimed in claim 2 including a quarter wave plate and a polarization sensitive beam splitter located between the lens system and the radiation sensitive detection systems and wherein the radiation produced by said radiation source means is linearly polarized.

9. An arrangement as claimed in claim 7 or 8 wherein the beam of radiation incident on the surface to be measured varies simultaneously in two mutually perpendicular directions.

10. Apparatus for detecting the presence of electronic components at specific positions on a support means including a radiation sensitive detection system and drive means for moving the detection system and the support means relative to one another, said detection system being in an arrangement as claimed in claim 1 which determines the distance between the support means with said components and said reference plane.

11. Apparatus for detecting the presence of electronic components at specific positions on a support means including two radiation sensitive detection systems and drive means for moving the detection systems and the support means relative to one another, said detection systems being in an arrangement as claimed in claim 2 which determines the distance between the support means with said components and said reference plane.

12. Apparatus for detecting the presence of components on a support means as claimed in claim 10 wherein the apparatus comprises a circuit for determining the phase relationship between the direction of the radiation beam and the output signal of the radiation sensitive detection system.

13. Apparatus for detecting the presence of components on a support means as claimed in claim 11 wherein the apparatus comprises a circuit for determining the phase relationship between the direction of the radiation beam and the output signals of the radiation sensitive detection systems.

* * * * *